United States Patent [19]

Schoen et al.

[11] 4,358,074
[45] Nov. 9, 1982

[54] PROPULSION SYSTEM FOR V/STOL AIRCRAFT

[75] Inventors: Allen H. Schoen, Woodbury, N.J.; John J. Schneider; David Bevan, both of Media, Pa.; Harold Rosenstein, Havertown; David R. Woodley, Media, both of Pa.

[73] Assignee: The Boeing Company, Seattle, Wash.

[21] Appl. No.: 42,263

[22] Filed: May 24, 1979

[51] Int. Cl.³ .............. B64C 15/02; B64C 21/04; B64C 29/00

[52] U.S. Cl. .................. 244/12.4; 244/207; 244/52; 244/12.5

[58] Field of Search .............. 244/12, 23, 207, 216, 244/52, 51

[56] References Cited

U.S. PATENT DOCUMENTS

| | | | |
|---|---|---|---|
| 2,761,634 | 9/1956 | Velazquez | 244/12.5 |
| 2,968,452 | 1/1961 | Cook | 244/12.5 |
| 2,974,899 | 3/1961 | Fowler | 244/12.5 |
| 3,248,877 | 5/1966 | Alderson et al. | 244/23 D |
| 3,312,426 | 4/1967 | Fowler | 244/12.5 |
| 3,482,804 | 12/1969 | Pyptiuk | 244/12.3 |
| 3,756,542 | 9/1973 | Bertin | 244/12.5 UX |
| 3,806,068 | 4/1974 | Blythe et al. | 244/12.5 |
| 3,863,867 | 2/1975 | Souslin et al. | 244/12.5 |
| 3,971,534 | 7/1976 | Grotz | 244/207 |
| 4,205,813 | 6/1980 | Evans et al. | 244/23 D |

*Primary Examiner*—Galen L. Barefoot
*Attorney, Agent, or Firm*—Felix J. D'Ambrosio; Jack D. Puffer; Edwin E. Greigg

[57] ABSTRACT

A propulsion system for an aircraft having a fuselage and a wing with two nacelles disposed on opposite sides of the fuselage, each of the nacelles having a turbo fan therein with drive means connected thereto for air flow through the nacelle from a forward air inlet to air exit openings, the air flow within the nacelle divided into twi air streams, one of the air-streams being directed downwardly through a variable area forward chin nozzle provided with a cascade of vanes for directing the outflow in a desired direction with the other air stream exhausted through an aft nozzle of variable area at the aft outlet opening against a slotted flap system mounted aft of the aft nozzle against which the outflow from the aft nozzle is directed so that the two air streams provide pitch, roll and yaw control as well as balanced lift and propulsion utilizing controlled thrust modulation and vectoring for all regimes of flight from vertical takeoff and landing (VTOL) or short takeoff and landing (STOL) or a combination of these and conventional flight through a combination of nozzle area change and wing flap vectoring.

9 Claims, 10 Drawing Figures

FIG. 4
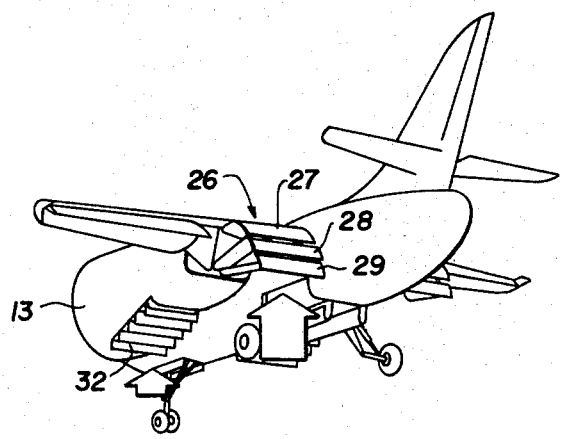
FIG. 5
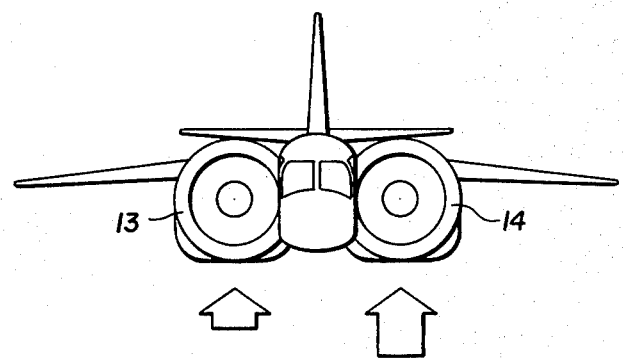
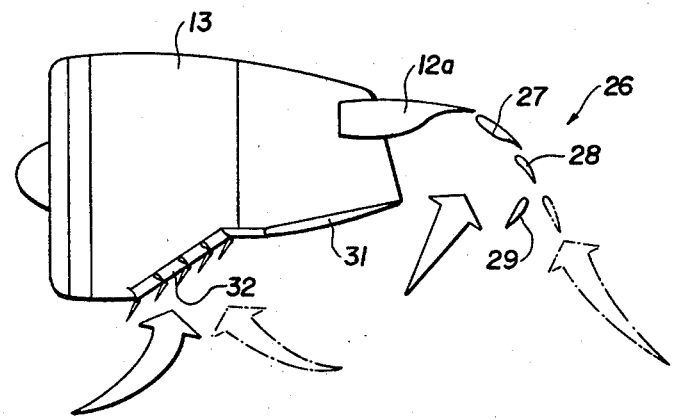
FIG. 6

PROPULSION SYSTEM FOR V/STOL AIRCRAFT

BACKGROUND OF THE INVENTION (a) Field of the Invention

The present invention relates generally to V/STOL aircraft, and in particular to utilizing the thrust of V/STOL aircraft developed by an engine driven fan for providing thrust modulation and thrust vectoring throughout various flight modes including hover, vertical ascent, descent and forward motion.

(b) Prior Art

We are familiar with one approach to V/STOL operation which utilizes a tilt nacelle configuration often with an additional fan in the nose or tail to provide pitch and yaw control. This approach has resulted in extremely complex and rugged rotation mechanisms imposing a serious weight penalty on the aircraft.

In another approach, the propulsion system is mounted in a fixed position and various means are provided for deflecting the outflow from the propulsion system to achieve the desired thrust vectoring. Such a fixed propulsion system usually requires an additional fan for pitch and yaw control. Also, such outflow deflecting systems have usually resulted in high thrust losses in one or both modes of operation and have additionally failed to provide the required smooth operation during transition from one flight mode to another. In addition, neither provides any significant augmentation of the aerodynamic lift for the aircraft transitioning from vertical flight to forward flight or vice-versa. Furthermore, with such present-day systems, rapid and efficient pitch, roll and yaw control of the aircraft in the low speed (including hover) and STOL flight modes have not been obtained and those systems have less than ideal short rolling takeoff capability when overloaded.

OBJECTS AND SUMMARY OF THE INVENTION

Accordingly, a primary object of this invention is to provide a novel V/STOL propulsion system which integrates the aerodynamic and propulsive lift in a highly efficient manner in all flight modes, but, particularly, where good low speed and STOL flight capability is required.

Another object of this invention is to provide a novel aircraft propulsion system which utilizes an integrated lift/cruise nacelle of a design which permits a more efficient match between available power and the fans in the high speed and/or the high altitude cruise and climb modes and which frees the fuselage volume of the encumbrance of a nose fan or tail fan and the associated drive system thereby enhancing the utility of the aircraft for the cargo and crew.

Still another object of this invention is to provide a novel V/STOL aircraft propulsion system which provides good "four-poster" stability and performance, unrestricted over-the-nose visibility, good center of gravity tolerance, a fixed nacelle structure and a relatively simple drive system.

Another object of this invention is to provide a novel propulsion system in which the total propulsion and low speed control is confined to nacelles and which provides pitch control, roll control and yaw control characterized by rapid and accurate response.

Still another object of this invention is to provide a novel V/STOL propulsion system which is extremely simple in construction, eliminates the weight and cost of nose fan or bleed air/control arrangements and provides a highly efficient thrust modulation and vectoring for all regimes of flight.

Another object of this invention is to provide a novel propulsion system for an aircraft that allows a smooth, continuous and fully reversible transition capability.

The objects of this invention and other related objects are accomplished by the provision of an aircraft having a fuselage and a wing extending on either side of the fuselage with at least two wing mounted nacelles configured with the wing on opposite sides of the fuselage. Each of the nacelles includes a fan driven by an engine. The interior of the nacelle defines a duct for conducting the fan exhaust rearwardly to an air exit opening defining an aft wing nozzle aft of which a slotted flap system is fitted to the trailing edge of the wing. The underside of the forward portion of each nacelle "chin" location is provided with an opening defining a nozzle in which are movably mounted a plurality of cascaded vanes and the fan exhaust is split between the forward nozzle and the aft wing nozzle so that the forward nozzle(s) and vanes and the aft nozzle(s) and flaps modulate the thrust for lift and control and direct the thrust for control.

These and other objects and features of the present invention will be apparent from the following detailed description taken with reference to the figures of the accompanying drawings.

BRIEF DESCRIPTION OF THE DRAWINGS

FIG. 4 is a perspective view of the aircraft of FIG. 1 illustrating the pitch control feature of the invention;

FIG. 5 is a front view of the aircraft of FIG. 1 showing the roll control feature of the invention;

FIG. 6 is a view similar to FIG. 2 showing the yaw control of the invention;

DESCRIPTION OF THE PREFERRED EMBODIMENT

Figure 1:
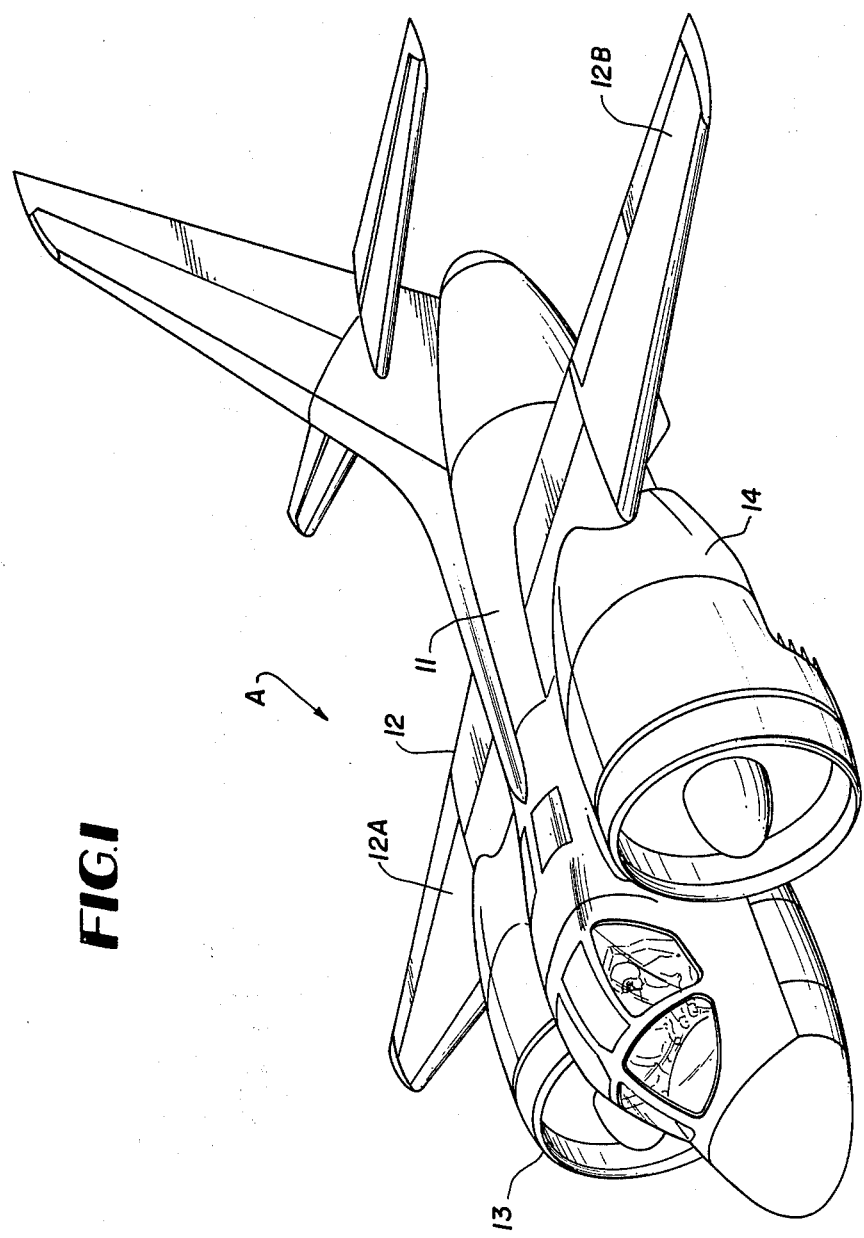
FIG. 1 is a perspective view of an aircraft incorporating the propulsion system of the invention.

Referring now to FIG. 1, there is shown an aircraft of the V/STOL type identified generally by the letter A and incorporating the propulsion system of the invention. The aircraft A includes a fuselage 11 having a wing 12 extending on either side of fuselage 11 and including two oppositely disposed sections 12A and 12B. The propulsion system of the invention utilized on the aircraft A includes two nacelles, 13, 14 of substantially identical construction and covering the inboard portions of the wing sections 12A, 12B respectively, on opposite sides of the fuselage 11. It should be understood that the nacelles 13, 14 may be partially over the wing 12. Also, the nacelles may be wing-supported or to some degree integral with the fuselage 11.

As specifically illustrative of the invention, there is shown (FIG. 2) one of the nacelles 13 which includes a housing 16 having a forward portion 16a and an aft portion 16b, and an interior extending longitudinally throughout the housing 16 and forming a duct 17. The nacelle 13 includes a forward air inlet opening 18, adjacent and aft of which is mounted a fan 19 in a conventional manner. As is well known, the fan 19 is arranged to be rotated by an engine 21 of the turbine type supported by struts or other suitable means (not shown) either centrally within the interior of the nacelle housing 16 or above the wing. The drive shaft of the engine 21 is drivably connected to the fan 19 by a drive train 22 of conventional construction. Preferably, a take-off shaft 23 is also connected to the drive train 22 through which auxiliary components such as pumps, motors and the like may be driven.

Although a single engine 21 is included in each nacelle, the invention contemplates a four engine configuration as well. With this configuration, each nacelle would include two engines with their drive shafts connected in parallel into the drive train 22.

Figure 8:
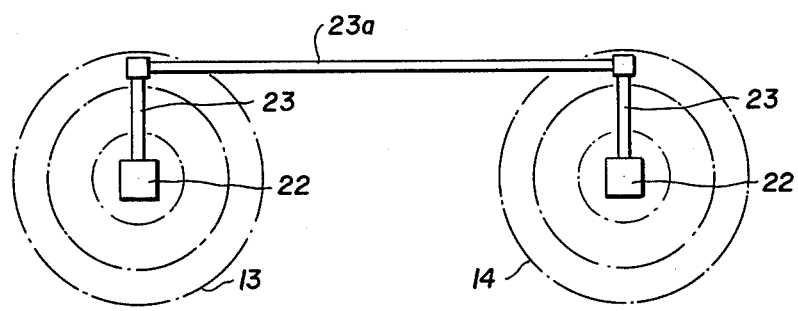
FIG. 8 is a schematic illustration of one embodiment of a driving arrangement for interconnecting the engines in the aircraft of FIG. 1.
Figure 9:
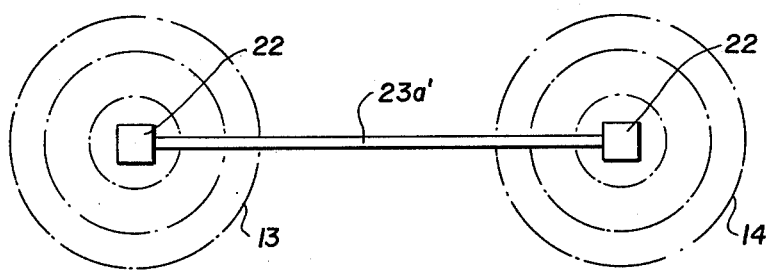
FIG. 9 is a view similar to FIG. 8 of a second embodiment of the driving arrangement.
Figure 10:
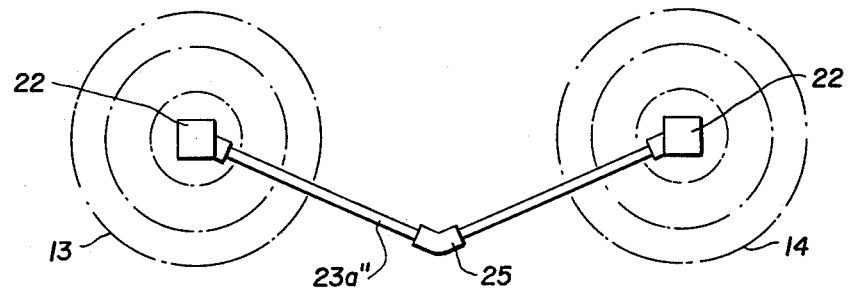
FIG. 10 is a view similar to FIG. 8 of a third embodiment of the driving arrangement.

In one embodiment as shown in FIG. 8, the take-off shafts 23 of each nacelle 13, 14 connected at one end to the drive train 22 are interconnected by a cross shaft 23a extending across the aircraft A so as to interconnect the engines 21. Thus, with the two engines interconnected, a margin of safety is provided. In the event of a single engine failure, power can be transferred thereby avoiding asymmetric thrust and loss of control. In the modification of FIG. 9, the take-off shafts 23 are omitted and the drive trains 22 are interconnected directly by a cross shaft 23a'. In the driving arrangement of FIG. 10, a further modification is shown wherein the take-off shafts 23 are omitted and a split cross shaft 23a'' is utilized.

The cross shaft configuration can also be used for roll control during hover, as will be discussed hereinafter.

The nacelle 13 is provided with an aft opening 24 which forms an aft wing nozzle for modulating a portion of the thrust developed by the exhaust from the fan 19 flowing aft in the direction of the arrow I and the core flow from the engine, when the engine is located in the nacelle. Thus, the core flow from the engine 21 is mixed with the fan flow for thrust vectoring and area control. The mixing also provides reduced flap element temperature and a cooler exhaust.

Aft of the wing section 12A a slotted deflector flap system, designated generally by the numeral 26, is fitted to the trailing edge of the wing section 12A and includes a plurality of flap segments. In the illustrated embodiment, three such flap segments 27, 28 and 29 are provided which form a multi-slotted deflector flap thereby providing the means for deflecting or turning the fan thrust, or fan and core thrust, and provide a varying amount of vertical/horizontal force for lift-thrust-drag control. Thus, the fan thrust, which is variable, also provides a means of lift and total force control. The last segment 29 of the flap system 26 is pivotally movable between the solid line and dotted line positions of FIG. 6 as will be explained hereinafter.

Figure 2:
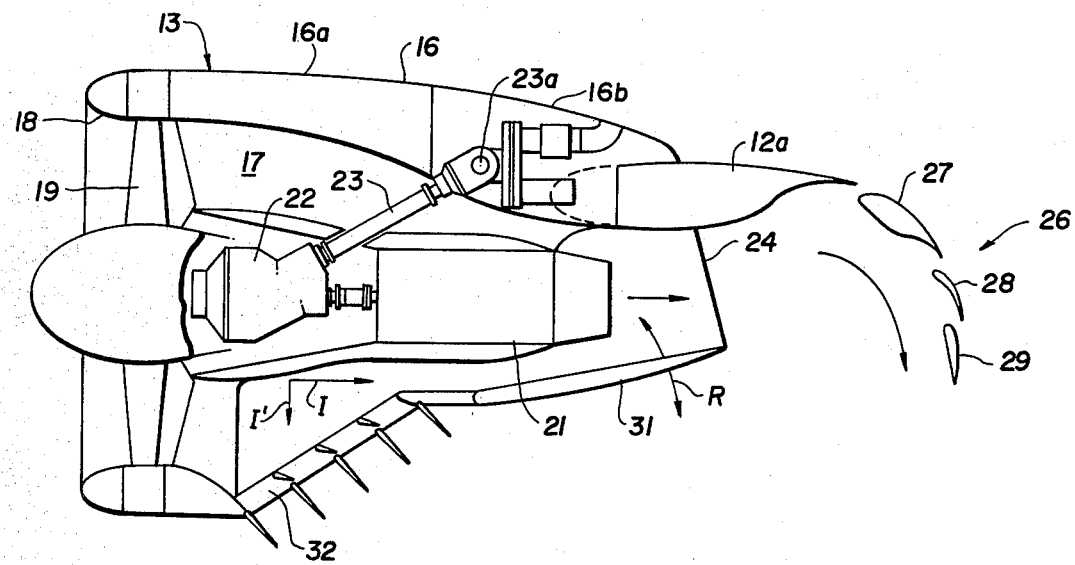
FIG. 2 is a side elevational view partially broken away of the nacelle of the invention showing schematically the component parts of the invention.

The air outlet opening 24 which forms the aft wing nozzle is arranged to be of variable area by the pivotal mounting of a lower aft portion 31 on the nacelle housing 16, the aft portion 31 being pivotally movable in the direction of the double arrow R of FIG. 2 by suitable control means. It should be understood that the control means for pivotally moving the aft portion 31 as well as the other movable components of the propulsion system of the present invention are well known conventional type flight control systems commonly used in aircraft control systems and are not described further.

In accordance with the construction of the nacelle of the invention, a forward opening 32 is provided in the underside of the forward portion of the nacelle 13 to form what is referred to as a chin blowing nozzle which is utilized to split the fan thrust in duct 17 in two airstreams between such chin blowing or forward nozzle and the aft wing nozzle formed by the aft opening 24. Thus, part of the exhaust generated by fan 19, flows in the duct 17 aft in the direction of the arrow I and part downwardly through the chin nozzle 32 in the direction of the arrow I'. This results in what can be referred to as a four-poster configuration (two nacelles with the airstream from the fan 19 in each nacelle being split into two airstreams).

This configuration of an aft nozzle and slotted deflector flap system and a chin blowing nozzle at the forward opening for each nacelle, i.e., forward of the leading edge of the wing, provides a propulsion nacelle concept, with the total propulsion and low-speed control system confined to the nacelles.

Figure 3:
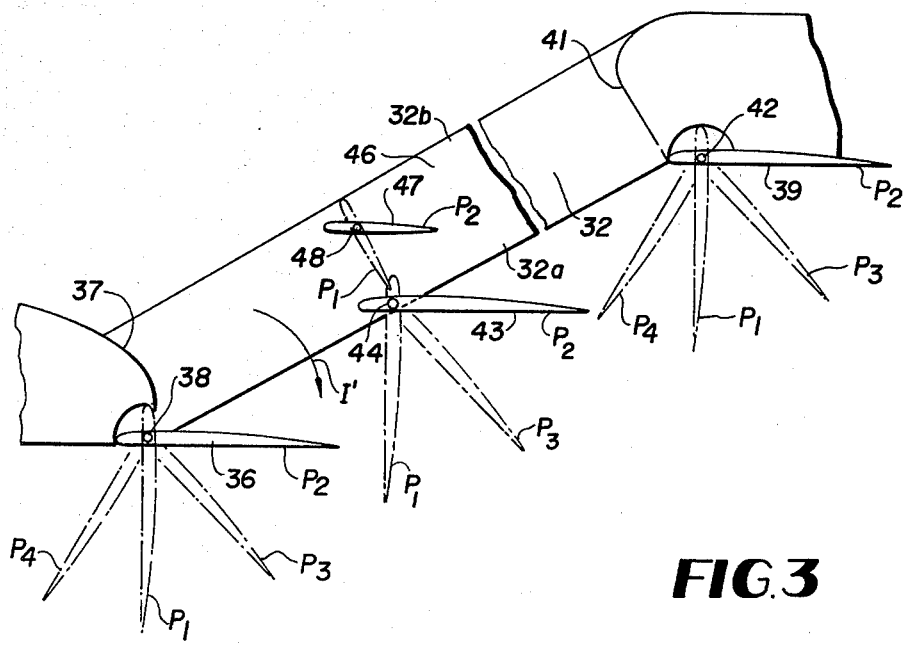
FIG. 3 is an enlarged view of a portion of the forward chin nozzle of the nacelle of FIG. 2.

Referring now to FIG. 3, the forward nozzle 32 is provided with a plurality of cascaded vanes pivotally mounted in the opening 32 for varying the magnitude and the longitudinal direction of the fan exhaust flowing therethrough in the direction of the arrow I'. More specifically, the plurality of cascaded vanes include a lower vane 36 pivotally mounted on the forward lower edge portion 37 of the nacelle 13, 14 adjacent the outer edge 32a of the nozzle opening 32 at a pivot point 38. Thus, the lower vane 36 together with the other cascaded vanes, as will be explained hereinafter, is pivotally movable between a downwardly directed, full vertical lift position, shown in broken lines in FIG. 3 and designated as $P_1$ for lift thrust and a fully rearward-directed, horizontally extending full cruise thrust position, shown in solid lines in FIG. 3 and designated as $P_2$, for providing forward thrust for accelerating and cruising. As can be understood, vane 36 and the associated vanes may assume any intermediate position between the full vertical lift position $P_1$ and the full cruise thrust position $P_2$ such as shown in broken lines in FIG. 3 and designated as $P_3$.

The plurality of cascaded vanes also includes an upper vane 39 mounted on the aft upper edge portion 41 of the nacelles 13, 14 adjacent the outer edge 32a of the nozzle opening 32. Vane 39 is pivotally mounted at pivot point 42 for movement between the full vertical lift position and the full cruise thrust position identified as $P_2$ (and into a selected intermediate position $P_3$), pivotal movement of the lower and upper vanes 36 and 39 being accomplished simultaneously whereby the vanes occupy the same angular position. Vanes 36 and 39 can additionally be used to vary the area of nozzle opening 32 and can also be deflected past the vertical for yaw control, backward flight or hover in a tail wind, such positions being shown in broken lines in FIG. 3 and identified as $P_4$. It should be understood that it is within the scope of the invention to utilize other cascade systems such as variable camber systems or flexible vanes.

The cascaded vanes in the forward nozzle 32 also include a plurality of intermediate vanes and, in the embodiment of FIG. 3, each of these intermediate vanes are identified by the numeral 43. Each of the intermediate vanes is pivotally mounted at pivot point 44 on the side edges 46 of nacelles 13, 14 defining the nozzle opening 32 and adjacent the outer edge 32a of opening 32. The vanes 43 which are preferably disposed in uniform spaced-apart relationship with each other and with the lower and upper vanes 36, 39 are pivotally movable between the position $P_4$, the full vertical lift position $P_1$ and the full cruise thrust position $P_4$, $P_2$ corresponding to positions $P_1$, and $P_2$ of the lower and upper vanes 36, 39 and into the selected intermediate position $P_3$ with gang operation of all of the vanes 36, 39 and 43 as explained above.

The cascaded vanes in the forward nozzle 32 also include a plurality of supplementary vanes 47, corresponding to the plurality of intermediate vanes 43 which are similarly arranged in uniform spaced-apart relationship. The supplementary vanes 47 are pivotally mounted at pivot point 48 on the side edge portions 46 of the nacelles 13, 14 adjacent the inner edge 32b of the forward nozzle opening 32 for pivotal movement between the full vertical lift position $P_1$ corresponding to the position $P_1$ of its associated intermediate vane 43 and the full cruise thrust position corresponding to the position $P_2$ of its associated intermediate vane 43. In the position $P_1$ of each supplementary vane 47 and its associated intermediate vane 43, the outer end of vane 47 is disposed in mating relationship with the associated intermediate vane 43 as shown, it being understood that the supplementary vanes 47 are also movable into a selected intermediate position $P_3$.

As can be understood, by means of suitable controls all of the vanes in the cascaded vane system disposed in the forward nozzle opening 32 can be moved simultaneously modulating the split efflux of fan 19 flowing in the direction of the arrow I'. The intermediate vane 43 together with the lower and upper vanes 36, 39 and with the supplementary vanes 47 vector the air flow plus some forward or aft deflection as required for control, downward or aft as required. However, it should be understood that the vanes may be moved individually to control the volume of flow as well as simultaneously to change the direction of flow.

In the cruise mode, the forward nozzle 32 is vectored aft and the total nozzle area reduced to obtain the best efficiency.

The multi-slotted deflector flap system 26 fitted to the wing trailing edge provides the means for deflecting the remainder of the fan thrust not diverted through the forward nozzle 32, and the core engine exhaust thrust, to provide a varying amount of vertical/horizontal force for lift-thrust-drag control.

The fan thrust is variable by either variable inlet guide vanes (VIGV) or variable pitch and also provides a means of lift control and total force control.

It should also be understood that through the use of a cross shaft connecting the engines, variable thrust may be obtained from each engine by merely varying the loads and transferring power through the cross shaft without changing engine power settings.

As shown in FIG. 4, pitch control for hover and/or low speed is obtained by varying the areas of the aft and forward nozzles 24, 32 thus transferring exit momentum from one nozzle to the other. Pitching moment control is accomplished by the amount of thrust produced at each forward nozzle relative to the thrust being deflected at each flap. For example, in FIG. 4, the vertical force at the forward nozzle 32 is decreased or increased and the vertical force at the flaps 26 is increased or decreased to produce a pitch couple. This is accomplished by commands to the forward nozzle vanes and variable nozzle 24. The total vertical force can be held constant on each nacelle-wing panel to avoid any coupling of pitch motion with vertical acceleration.

As shown in FIG. 5, a rolling moment is achieved by an equal and opposite variation of the thrust. A right roll is depicted, showing an increased vertical force on the left side of the aircraft and a decreased vertical force on the right. As noted above, rapid roll control response in hover is achieved by varying the pitch of the fans. Roll control can also be achieved by power transfer over the cross shaft for creating a force unbalance such as is shown in FIG. 5.

With respect to yaw control, reference is made to FIG. 6 wherein the yaw control is accomplished by deflecting the forward nozzle vanes and varying the angle of the outermost trailing edge segment of the slotted deflector flap system. Separate movement of this outermost flap segment is anticipated for two functions: symmetrical movement to angles greater than 90 degrees for hovering in a tailwind and smaller angles for hovering in a headwing; and differential movement for yaw control. A right yaw, as shown in FIG. 6, is generated by commanding an aft deflection of the forward nozzle vanes and flap on the left side (solid arrow) and forward deflection of the forward nozzle vanes and flap on the right side of the aircraft (dashed arrow).

With respect to height control, control of vertical velocity is achieved by modulating the fan thrust equally in the same sense at each nacelle 13, 14.

Conventional aerodynamic surface controls are used in the cruising flight mode. Pitching moment for trim is generated by varying horizontal tail incidence; roll control by aileron action of the outboard trailing-edge wing flaps; and directional control by a conventional rudder in the vertical tail.

Conversion control, or control during transition, i.e., during the flight phase between hover and cruise, is accomplished with a combination of hover controls and aerodynamic surface controls. As airspeed increases from hover, the hover controls are gradually phased out as cruise control effectiveness increases. This phasing is accomplished automatically by the aircraft's flight control system, slaved to the wing flap and chin vane positions.

According to a preferred arrangement, the slotted flap system 26 deflects the exhaust through substantially 90 degrees for vertical flight, with additional angular deflection capability for control, for example yaw as noted above. This can be achieved by either lower surface blowing or a combination of lower surface and upper surface blowing. By surface blowing is meant that the fan thrust is directed to the flap system 26 along the lower surface of the nacelle wall (lower surface blowing—FIG. 3), or along the upper and lower surface of the nacelle wall (combined surface blowing). The thrust recovery of the aft blown flap system 26 at 90 degrees deflection angles is approximately 90% (10% turning losses, i.e., 10% of the thrust is lost in turning the thrust through 90 degrees) and the super circulation induced by the deflected jet provides an incremental gain in the wing-lift coefficient of approximately 100%.

Figure 7:
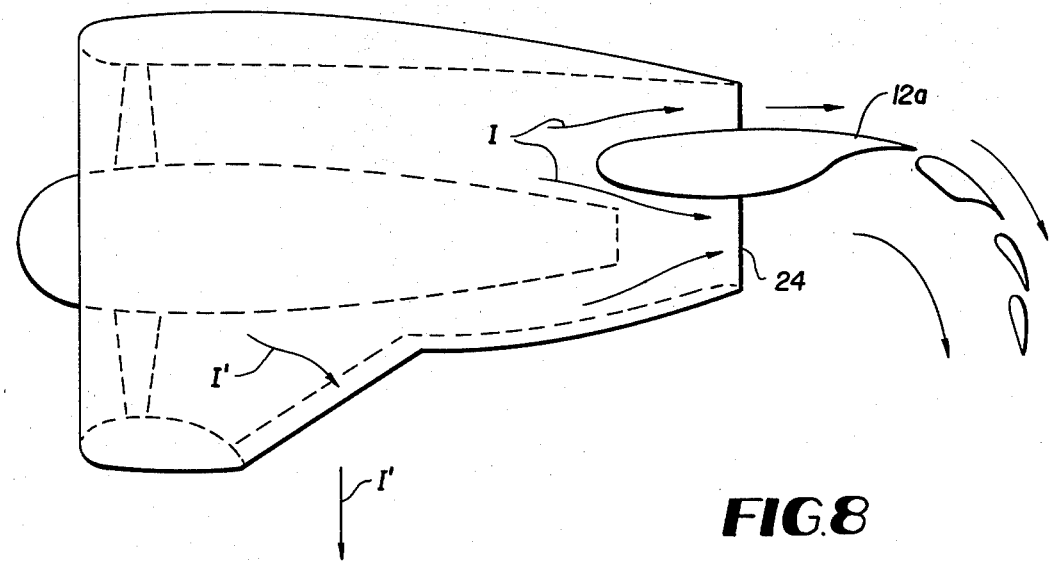
FIG. 7 is a schematic illustration similar to FIG. 2 of another arrangement of the nacelles of the invention.

FIG. 7 shown schematically another arrangement for positioning the nacelles 13, 14 on the aircraft wing 12, one wing section 12a being illustrated. In FIG. 7, the nacelle is moved upwardly from the position shown in FIG. 2 so that air is blown over both the upper and lower surfaces of the wing section 12. The part of the split fan exhaust which flows through the aft exit nozzle 24 is indicated by the arrows I as in the embodiment of FIG. 2 wherein the airstream flows only over the bottom surface of the wing section 12a.

The forward nozzle aft flap system configuration provides a propulsive nacelle concept, with the total propulsion and low speed control system confined to the nacelles. An interconnect or cross shaft connects the two nacelles but is used only in the event of engine failure or, with a moderate power transfer, for roll control during hover.

What is claimed and desired to be secured by Letters Patent of the United States is:

1. A propulsion system yaw control for V/STOL aircraft having a fuselage and a wing extending on either side of the fuselage comprising, in combination, at least two wing mounted nacelles configured with said wing on opposite sides of said fuselage, each of said nacelles including an interior defining a duct having a forward portion defining an air inlet opening and an aft portion defining a rear air exit opening, a chin blowing nozzle in the underside of the forward portion of each of said nacelles situated between the forward air inlet opening and the rear air exit opening of the nacelle, a fan and at least one engine for driving the fan disposed within the duct of each of said nacelles, said engine being of the type generating a core exhaust flow, said fan being mounted for rotation between the forward air inlet opening and the chin blowing nozzle of the nacelle, said chin blowing nozzle being further situated forward of the engine core exhaust, and having a plurality of adjustable cascaded vanes disposed therein for pivotal movement between a forward direction and an aft direction relative to the aircraft, said vanes serving to divert one portion of the airstream from said fan from its flow direction in said duct outwardly from the nacelle, and a slotted flap system mounted on said wing aft of the rear air exit opening of each of said nacelles, each of said nacelles being mounted on said wing so that at least a portion of the other portion of the airstream and the engine core exhaust are directed below said wing for lower surface blowing with respect to said wing and the slotted flap system, said slotted flap system serving to divert the other portion of the airstream and the engine core exhaust exhausted from the nacelle from its exhausted flow direction, said slotted flap system comprising a plurality of flaps including a lowermost flap arranged for pivotal movement between a forward direction and an aft direction relative to the aircraft, wherein a differential pivotal movement of the vanes and the lowermost flap on each side of the fuselage effects yaw control of the aircraft.

2. A propulsion system yaw control in accordance with claim 1, including means for interconnecting the engines in each of said nacelles.

3. A propulsion system yaw control in accordance with claim 1, wherein the slotted flap system is adapted to divert the exhausted other portion of the airstream and the engine core exhaust through approximately 90° from its exhausted flow direction for vertical flight.

4. A propulsion system yaw control in accordance with claim 2, wherein said interconnecting means includes a cross-shaft extending across said fuselage and connected at opposite end to the engine in each of said nacelles.

5. A propulsion system yaw control in accordance with claim 1, wherein said plurality of adjustable vanes in said chin blowing nozzle includes a plurality of vanes mounted on the outer edge portion of said chin blowing nozzle arranged in uniform, longitudinally spaced relationship.

6. A propulsion system yaw control in accordance with claim 5, wherein said plurality of adjustable vanes includes a plurality of intermediate vanes disposed within said nozzle each associated with one of said vanes on the outer edge portion of said chin blowing nozzle.

7. A propulsion system yaw control in accordance with claim 1, wherein each nacelle further includes an aft nozzle of variable area disposed in the aft portion at said rear air exit opening for control of exhausting the other portion of the airstream and the engine core exhaust from the nacelle.

8. A propulsion system control for V/STOL aircraft having a fuselage and a wing extending on either side of the fuselage comprising, in combination, at least two wing mounted nacelles configured with said wing on opposite sides of said fuselage, each of said nacelles including an interior defining a duct having a forward portion defining an air inlet opening and an aft portion defining a rear air exit opening, a chin blowing nozzle in the underside of the forward portion of each of said nacelles situated between the forward air inlet opening and the rear air exit opening of the nacelle, a fan and at least one engine for driving the fan disposed within the duct of each of said nacelles, said engine being of the type generating a core exhaust flow, said fan being mounted for rotation between the forward air inlet opening and the chin blowing nozzle of the nacelle, said chin blowing nozzle being further situated forward of the engine core exhaust, a plurality of adjustable cascaded vanes disposed within said chin blowing nozzle for diverting one portion of the airstream from said fan from its flow direction in said duct outwardly from the nacelle, an aft nozzle of variable area disposed in the aft portion at said rear air exit opening of each of said nacelles for control of exhausting the other portion of said airstream and the engine core exhaust from the nacelle, and a slotted flap system mounted on said wing aft of each of said aft nozzles for diverting the exhausted other portion of the airstream and the engine core exhaust from its exhausted flow direction, wherein each of said nacelles is mounted on said wing so as to split the other portion of said airstream into two streams for upper surface blowing and lower surface blowing with respect to said wing and the slotted flap system, the lower surface blowing being effected by one of said two streams and the engine core exhaust.

9. A propulsion system yaw control in accordance with claim 8, wherein each of said nacelles includes a movable portion in the underside of the aft portion of said nacelle to define said aft nozzle.

* * * * *